United States Patent
Shirai

(10) Patent No.: US 7,042,389 B2
(45) Date of Patent: May 9, 2006

(54) DEVICE FOR DETECTING OBJECT IN FRONT OF VEHICLE

(75) Inventor: Noriaki Shirai, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/100,154

(22) Filed: Apr. 6, 2005

(65) Prior Publication Data

US 2005/0225479 A1    Oct. 13, 2005

(30) Foreign Application Priority Data

Apr. 9, 2004    (JP)    ............................... 2004-115839

(51) Int. Cl.
*G01S 13/93*    (2006.01)
*G01S 13/86*    (2006.01)

(52) U.S. Cl. ............................. 342/70; 342/27; 342/52; 342/53; 342/55; 342/104; 342/118; 342/175; 342/195; 382/100; 382/103; 382/104; 382/106; 382/107

(58) Field of Classification Search ................ 702/158; 180/167–169; 701/300, 301; 342/27, 28, 342/52–55, 70–72, 118, 165–175, 176, 179, 342/195, 104–115, 127–146; 382/100, 103, 382/104, 106, 107
See application file for complete search history.

(56) References Cited

U.S. PATENT DOCUMENTS 6,326,915 B1 *  12/2001  Chen et al. .................... 342/71
6,590,521 B1 *  7/2003   Saka et al. ..................... 342/70
6,670,912 B1 *  12/2003  Honda .......................... 342/70
6,795,014 B1 *  9/2004   Cheong ....................... 342/118
6,823,261 B1 *  11/2004  Sekiguchi .................... 701/301
6,831,591 B1 *  12/2004  Horibe ......................... 342/52
6,834,254 B1 *  12/2004  Sekiguchi .................... 702/158
6,859,730 B1 *  2/2005   Sekiguchi .................... 701/301
6,873,912 B1 *  3/2005   Shimomura ................. 701/301
6,903,677 B1 *  6/2005   Takashima et al. ........... 342/70

FOREIGN PATENT DOCUMENTS

JP    9-264954    10/1997
JP   11-044533     2/1999

* cited by examiner

*Primary Examiner*—Bernarr E. Gregory
(74) *Attorney, Agent, or Firm*—Harness, Dickey & Pierce, PLC

(57) ABSTRACT

A device including a radar and a camera for detecting an object located in front of an automobile is mounted on the automobile. The radar detects a distance from the automobile to the front object, and the camera takes an image of the object. When the object such as a preceding vehicle moves out of a region detectable by the radar while remaining in a region covered by the camera, a present distance to the object is calculated based on the distance previously detected by the radar and memorized in a memory and a present object image taken by the camera. More particularly, the present distance is calculated by multiplying the memorized distance by a ratio of an object size in the memorized image to an object size in the present image.

10 Claims, 3 Drawing Sheets

PRESENT DISTANCE $$Zd = Z0 \times \frac{Wd0}{Wd1}$$

DEVICE FOR DETECTING OBJECT IN FRONT OF VEHICLE

CROSS-REFERENCE TO RELATED APPLICATION

This application is based upon and claims benefit of priority of Japanese Patent Application No. 2004-115839 filed on Apr. 9, 2004, the content of which is incorporated herein by reference.

BACKGROUND OF THE INVENTION

1. Field of the Invention

The present invention relates to a device for detecting an object such as a preceding vehicle driving in front of an automotive vehicle.

2. Description of Related Art

An image processing system that uses data detected by a radar has been known hitherto. For example, JP-A-9-264954 discloses a system in which an image region is searched on an image frame, using data detected by a radar such as a distance to a preceding vehicle and a position of the preceding vehicle relative to a vehicle on which the system is mounted. In this system, however, the search for the image region cannot be performed when the data from the radar become unavailable.

To cope with this problem, JP-A-11-44533 proposes a system, in which a template image is memorized when the distance data detected by a radar are available, and an image region which is closest to the memorized template image is searched on an image frame taken when the data from the radar become unavailable. The distance to the preceding vehicle is calculated based on the position thus estimated on the image frame.

In the conventional systems, however, it is difficult to accurately calculate the distance to the preceding vehicle based on an estimated position of the preceding vehicle on the image frame, because the position of the preceding vehicle moves up and down in the image frame when the vehicle makes pitching. In the conventional system disclosed in JP-A-11-44533, the distance to the preceding vehicle cannot be accurately calculated based on the memorized template image if the distance to the preceding vehicle changes during a period in which the data from the radar are not available.

SUMMARY OF THE INVENTION

The present invention has been made in view of the above-mentioned problems, and an object of the present invention is to provide an improved device for detecting an object located in front of an automotive vehicle, wherein the distance to the preceding vehicle is accurately calculated based on an image data when the distance is not detected by a radar.

The device for detecting an object located in front of an automobile is mounted on the automobile. The object-detecting device includes a radar for detecting a distance to the front object such as a preceding vehicle. The object-detecting device further includes a camera such as a CCD camera for taking a front image including the object such as a preceding vehicle. Object data detected by the radar and the front image taken by the camera are sent to a vehicle controller that controls a driver-assisting system.

When the front object such as the preceding vehicle is within a region covered by both of the radar and the camera, a distance to the object detected by the radar and a front image taken by the camera are memorized in a memory. When the front object moves out of the radar region while remaining in the camera region, a present distance (Zd) to the object is calculated based on the memorized distance (Z0) and a ratio of an object size (Wd0) in the memorized object image to an object size (Wd1) in the present object image. That is, the present distance to the object located in front of the automobile is calculated according to a formula: $(Zd) = (Z0) \times (Wd0)/(Wd1)$.

The radar region (the region in which the object is detectable by the radar) is set to a 20-degree angle along a driving direction of the automobile, while the camera region (the region in which the object image can be taken by the camera) is set to a 40-degree angle along the same driving direction. The radar region is included in the camera region. Therefore, it is highly possible that the object moves out of the radar region while remaining in the camera region.

In order to restrict an image region to be searched for extracting an object image corresponding to the memorized object image from the present image, an vertical size of the object may be restricted to a predetermined size. The image region to be searched may be defined at both sides of a center position of the object. Alternatively, the size of the memorized object image may be enlarged or reduced to find the object image corresponding to the memorized object image in the present image.

According to the present invention, even when the object moves out of the radar region, the distance to the front object can be accurately calculated based on the memorized distance and the front image presently taken by the camera as long as the object is in the camera region. Other objects and features of the present invention will become more readily apparent from a better understanding of the preferred embodiment described below with reference to the following drawings.

DETAILED DESCRIPTION OF THE PREFERRED EMBODIMENT

Figure 1:
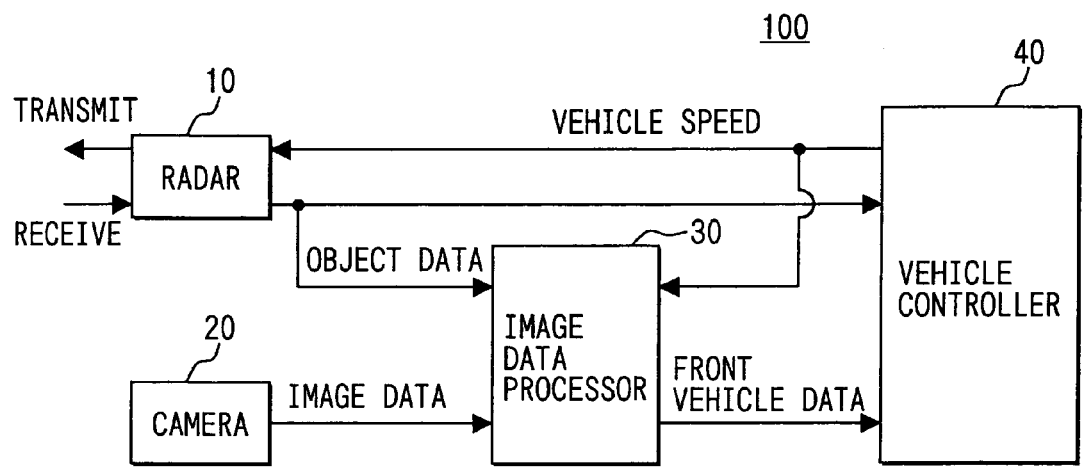
FIG. 1 is a block diagram showing an entire structure of a driver-assisting system including an object-detecting device according to the present invention.

A preferred embodiment of the present invention will be described with reference to accompanying drawings. FIG. 1 shows a driver-assisting system 100 including an object-detecting device according to the present invention. The driver-assisting system 100 is mounted on an automotive vehicle and controls a driving system, a braking system and a steering system of the vehicle in assisting a driver. For example, a distance between a preceding vehicle and an own vehicle is automatically maintained constant to thereby avoid a collision.

Figure 2:
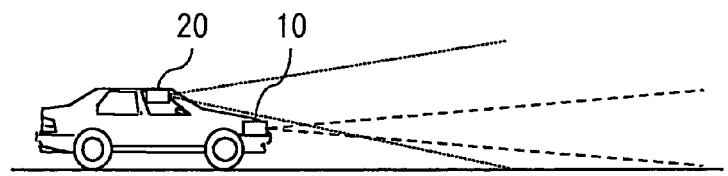
FIG. 2 shows positions of a radar and a camera mounted on an automobile.

As shown in FIG. 1, the driver-assisting system 100 is composed of a radar 10, a camera 20, an image data processor 30 and a vehicle controller 40. The radar 10 is mounted on the vehicle at its front portion as shown in FIG. 2. A laser radar, a millimeter-wave radar or the like is used as the radar 10. Radar beams are transmitted forward from the vehicle, and radar beams reflected by an object such as a preceding vehicle are received. The object such as the preceding vehicle is detected based on the reflected beams received by a receiver.

Figure 3:
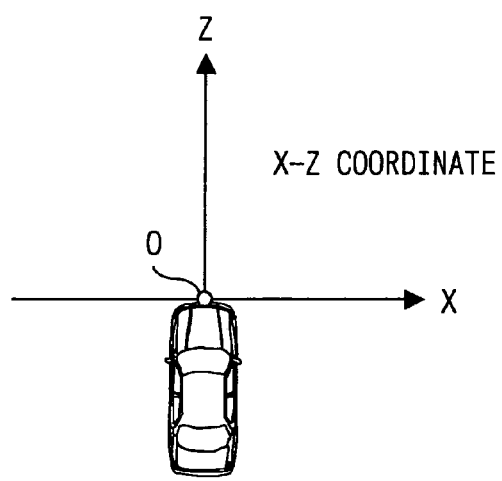
FIG. 3 shows a horizontal plane including an automobile in an X-Z coordinate.
Figure 4:
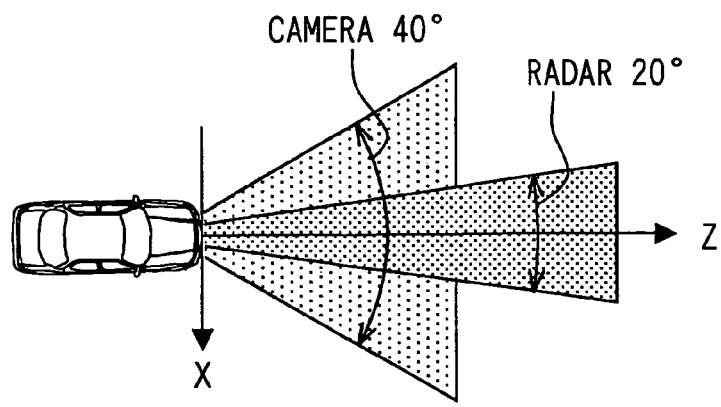
FIG. 4 is a schematic plan view showing regions in front of an automobile, which are detectable by a radar and a camera.

A horizontal plane including the automobile on which the object-detecting device is mounted is defined by an X-Z coordinate as shown in FIG. 3. The X-axis extends in a direction perpendicular to a driving direction of the vehicle, and the Z-axis extends in the driving direction. The origin of the coordinate is positioned at a front center of the vehicle. The radar 10 detects objects located in a radar range (or region) having a 20-degree angle in the X-Z plane as shown in FIG. 4. The radar 10 detects a distance (Z) and a relative speed (Vz) between the own vehicle and a preceding vehicle, and a position (X) of the preceding vehicle measured in the X-axis direction. The distance (Z), the relative speed (Vz) and the position (X) constitute object data which are sent from the radar 10 to the image data processor 30 and the vehicle controller 40 every 100 milliseconds, for example.

The camera 20 is a camera including an image sensor such as charge coupled devices (CCD) and mounted on the vehicle at a front position shown in FIG. 2. The camera 20 takes an image in front of the vehicle in a camera range (or region) having a 40-degree angle as shown in FIG. 4. Since the camera range includes the radar range, objects that are not detectable by the radar may be taken into a camera image. Generally, a range detectable by the camera 20 is wider than a range detectable by the radar 10. Accordingly, there is a region that is not detectable by the radar 10 but detectable by the camera 20. A shutter speed, a frame rate and a gain of the camera 20 are controlled by a controller (not shown), and a pixel value, i.e., a brightness level of each pixel, is sent to the image data processor 30 as the camera data together with horizontal and vertical synchronizing signals.

The image data processor 30 calculates front vehicle data including a distance to a preceding vehicle, a relative speed, a position of the preceding vehicle in X-direction, and a width of the preceding vehicle, based on the object data fed from the radar 10 and the image data fed from the camera 20. The front vehicle data are sent from the image data processor 30 to the vehicle controller 40 every 100 milliseconds, for example. The vehicle controller 40 controls the driving system, the braking system and the steering system based on the front vehicle data and the object data. Under situations where the preceding vehicle moves out of the radar range or where object data become unavailable due to malfunction of the radar 10, the distance to the preceding vehicle can be calculated based on the image data of the camera 20 in the manner explained below.

Figure 7:
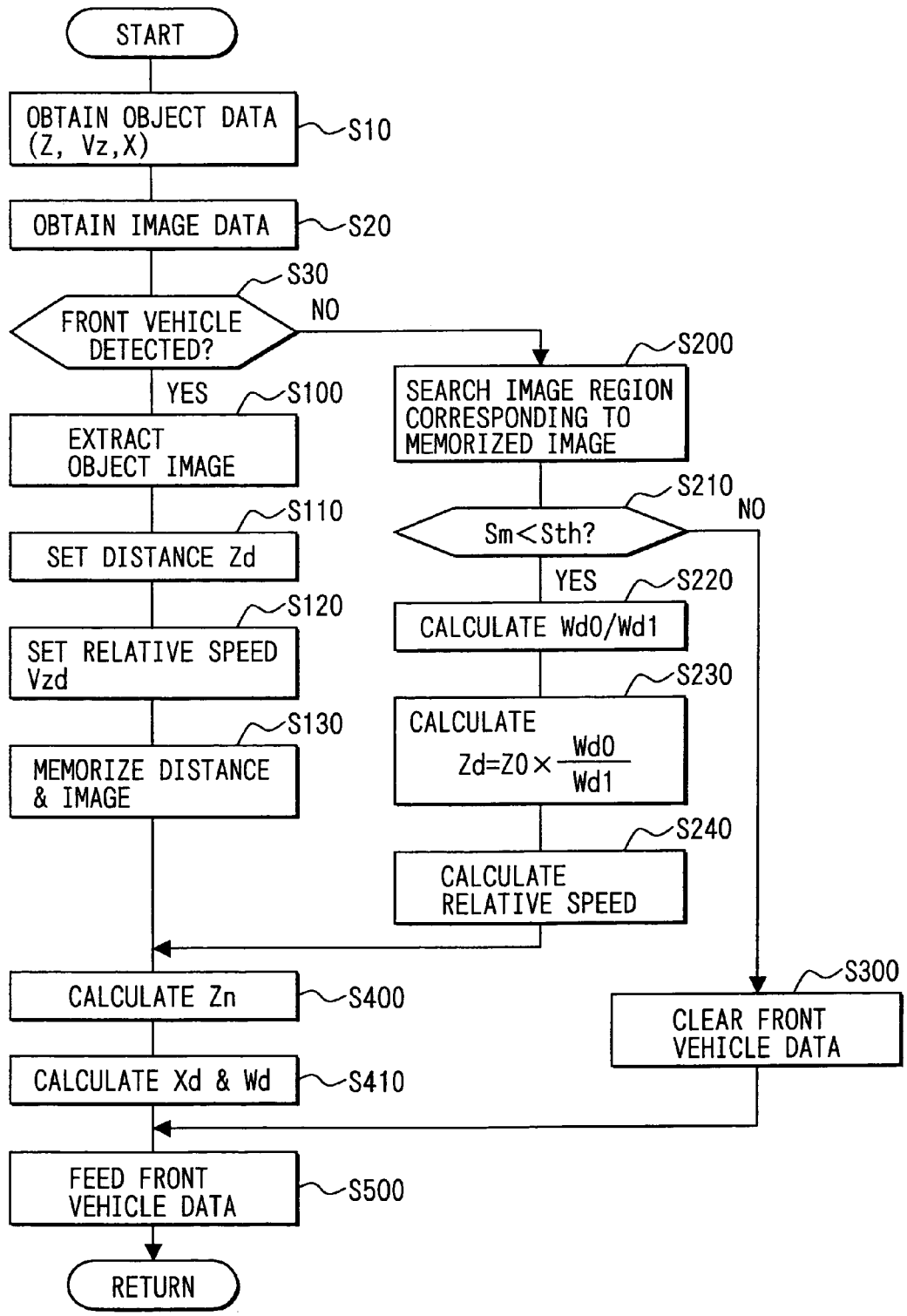
FIG. 7 is a flowchart showing a process of image-processing in the object-detecting device.

A process of the image-processing performed in the image data processor 30 will be described with reference to FIG. 7. At step S10, the object data consisting of the distance (Z), the relative speed (Vz) and the position (X) are obtained from the radar 10. At step S20, the image data are obtained from the camera 20. At step S30, whether or not the preceding vehicle is still being detected by the radar 10 is determined. That is, at step S30, whether the preceding vehicle has moved out of the radar range is determined. If the preceding vehicle is being detected by the radar 10, the process proceeds to step S100. If not, the process proceeds to step S200.

Figure 5:
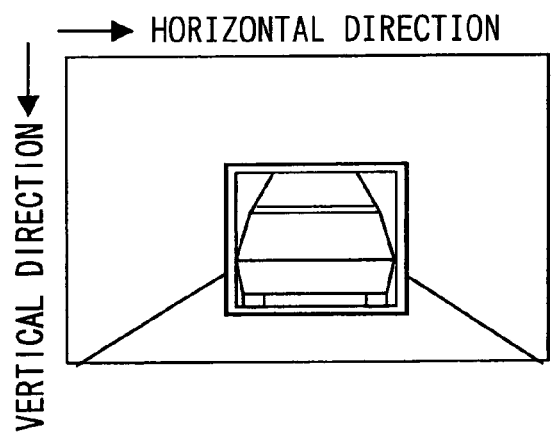
FIG. 5 shows an vehicle image extracted from an image taken by a camera.

At step S100, an image of the preceding vehicle as shown in FIG. 5 is extracted from a front image taken by the camera. At this step, an image region where the preceding vehicle image is included is searched from the front image taken by the camera 20 by restricting the image region based on the distance (Z) and the position (X) detected by the radar 10. That is, the image region in the horizontal and the vertical directions is restricted to a specific region based on the distance (Z) and the position (X).

Since a size of the vehicle image is inversely proportional to the distance (Z), and the horizontal position of the vehicle is determined by the position (X), the image region can be restricted to a specific region based on the distance (Z) and the position (X). By restricting the image region where the vehicle image is included, the vehicle image can be quickly and efficiently extracted from the front image taken by the camera 20. The vehicle image is extracted from the image region by a known method such as an edge-finding method or a pattern-recognition method. It is preferable to take into consideration an inclination of the road on which the vehicle is driving to further effectively specify the vertical position of the image region in the front image taken by the camera 20.

The size of the front vehicle (or a image region) can be determined based on the distance (Z) to the preceding vehicle in the following manner. Assuming that the camera region is 40-degree in the horizontal plane (X-Z plane) as shown in FIG. 4, a size of a picture-taking element is 7 μm×7 μm, and an image-resolution VGA (640×640), the number of pixels (Np) showing the preceding vehicle is expressed in the following formula:

$Np = $ (actual size of the preceding vehicle)$\times 879/(Z)$

Accordingly, if the actual size of the preceding vehicle (a width) is 1.2–2.5 meter and the distance (Z) is 50 meter, the number of pixels showing the preceding vehicle is 21–44. This means that the size of the preceding vehicle to be extracted from the front image taken by the camera 20 can be determined by the distance (Z). By restricting the size of the preceding vehicle to be extracted, the extracting process can be carried out in a short time, and accuracy of extraction is enhanced.

At step S110, the distance (Z) is set as a distance data (Zd) to be fed to the vehicle controller 40. At step S120, the relative speed (Vz) is set as a relative speed data (Vzd) to be fed to the vehicle controller 40. At step S130, the image of the preceding vehicle extracted at step S100 and the distance (Z) to the preceding vehicle are memorized as a pair. The memorized distance is referred to as (Z0). The memorized image and the distance are continuously renewed as long as the preceding vehicle is detected by the radar 10. At step S400, an estimated distance (Zn) to the preceding vehicle, which is expected at the next image-taking by the camera 20 after a predetermined interval ΔT (e.g. ΔT=100 milliseconds), is calculated in the following formula:

$(Zn) = (Zd) + (Vzd) \times \Delta T$

At step S410, a center position (Xd) of the preceding vehicle in the X-direction in the X-Z plane and a width (Wd) of the preceding vehicle are calculated from the extracted vehicle image. At step S500, the data for the preceding vehicle, i.e., (Zd), (Xd), (Wd) and the relative speed (Vzd) are fed to the vehicle controller 40.

As described above, the process proceeds from step S30 to step S200 when the radar 10 becomes unable to detect the preceding vehicle. At step S200, the size of the preceding vehicle image memorized at step S130 is enlarged or reduced to a size best matching the vehicle image on a present image of the preceding vehicle taken at step S20. For example, an absolute value of a difference between each pixel value (a brightness level of a pixel) in the memorized image and each pixel value in the present image is summed up as to all the pixels to obtain a sum of pixel value differences (Sm). The image region on the present image taken by the camera 20 is determined at a position where the sum of pixel value differences (Sm) takes a minimum value. In this manner, the image region in which the preceding vehicle is included can be searched on the present image even when the preceding vehicle is out of the radar region and the distance (Z) is different from the memorized distance (Z0) as long as the preceding vehicle is in the camera region.

An estimated size and/or position of the preceding vehicle on the present image may be calculated based on the estimated distance (Zn) calculated in step S400. A ratio of enlargement or reduction may be set according to the estimated size. If the ratio of enlargement or reduction obtained in this manner is used in searching the image region at step S200, a time for searching can be reduced compared with the case where the memorized vehicle size is enlarged or reduced at random. Further, the searching area in the present image can be restricted and the search time can be shortened by using the estimated position of the preceding vehicle and the center position of the preceding vehicle in the memorized image.

At step S210, whether the sum of pixel value differences (Sm) calculated at step S200 is smaller than a threshold value (Sth) is judged. If (Sm) is smaller than (Sth), the process proceeds to step S220 because this means that the preceding vehicle is in the camera range. If not, the process proceeds to step S300, where the front vehicle data are cleared because this means that the preceding vehicle is out of the camera range. At step S500, data showing that there is no preceding vehicle are sent to the vehicle controller 40.

Figure 6:
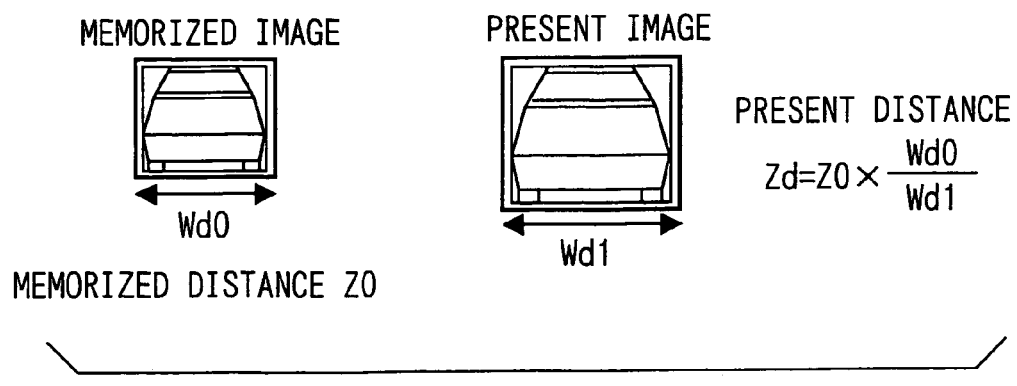
FIG. 6 shows a memorized image and a present image of a preceding vehicle.

At step S220, a size ratio of the preceding vehicle is calculated from both sizes in the memorized vehicle image and in the vehicle image in the image region searched at step S200. More particularly, as shown in FIG. 6, the size ratio is calculated by dividing the vehicle width (Wd0) in the memorized image by the vehicle width (Wd1) in the present image: (size ratio)=Wd0/Wd1. At step S230, the present distance (Zd) to the preceding vehicle is calculated in the following formula:

$$(Zd) = (Z0) \times Wd0/Wd1$$

At step S240, a present relative speed is calculated based on the present distance (Zd), a previous distance, and a previous relative speed. At step S400, the estimated distance (Zn) is calculated as mentioned above. At step S410, the center position (Xd) and the width (Wd) of the preceding vehicle are calculated. Then, the process proceeds to step S500, where the front vehicle data are fed to the vehicle controller 40.

As described above, in the object-detecting device of the present invention, the distance to the preceding vehicle (Z0) detected by the radar 10 and the vehicle image taken by the camera 20 are memorized as a pair. When the preceding vehicle moves out of the radar region and remains in the camera region, a present distance to the preceding vehicle is calculated based on the memorized image and a present image. More particularly, the present distance (Zd) to the preceding vehicle is calculated by the following formula: (Zd)=(Z0)×Wd0/Wd1, where Wd0/Wd1 is a vehicle size ratio in the memorized image and the present image.

In this manner, the distance to the preceding vehicle can be accurately calculated even when the preceding vehicle is out of the radar region as long as it is still in the camera region. In addition, when the preceding vehicle moves up and down in the image taken by the camera 20 due to pitching of the own vehicle, the distance to the preceding vehicle can be accurately calculated because the size of the preceding vehicle in the image does not change by the pitching. Since the distance (Z0) and the preceding vehicle image are memorized as a pair, the present distance to the preceding vehicle can be accurately calculated even when the distance to the preceding vehicle changes during a period in which the radar 10 is not able to detect the preceding vehicle.

The present invention is not limited to the embodiment described above, but it may be variously modified. For example, when it is determined that the preceding vehicle is included in the present image at the step S210 (refer to FIG. 7), the present image may be memorized in place of the previously memorized image. In this case, the present image and the distance calculated at step S230 are memorized as a pair. A large difference in the pixel value (a brightness level of a pixel) between the memorized image and the present image, which may occur if the memorized image is not renewed, can be avoided. When the preceding vehicle drives on a curved road, the side of the vehicle which was not seen in the previously memorized image becomes visible in the present image. This makes it difficult to calculate the distance to the preceding vehicle based on the ratio of the vehicle size. This situation is also overcome by renewing the memorized image.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A device for detecting an object located in front of an automobile, the detecting device comprising:
   a radar for detecting a distance to an object located in front of the automobile;
   means for taking a front image including an image of the object;
   means for memorizing the distance detected by the radar and the front image taken by the taking means, the distance and the front image being memorized as a pair;
   means for judging whether the front object is in a radar range; and
   means for calculating the distance to the object, when the front object is not in the radar range and the taking means is taking the image of the object, based on the memorized distance and a ration of an object size in the memorized front image to an object size in a present front image.

2. The object-detecting device as in claim 1, wherein:
   a first region in which the distance to the object is detectable by the radar is narrower than a second region in which the front image is able to be taken by the taking means, the first region being included in the second region, and the judging means judges that the radar is not detecting the distance when the object is out of the first region.

3. The object-detecting device as in claim 1, further including means for extracting the object image from the front image, wherein:
either a size of the object image to be extracted or an image region to be searched for extracting the object image being restricted based on the distance to the object detected by the radar.

4. The object-detecting device as in claim 3, wherein:
the extracting means extracts the object image from a region having a restricted vertical size.

5. the object-detecting device as in claim 3, wherein:
the radar further detects a horizontal position of the object measured from a line extending from a center of the automobile in a driving direction; and
the extracting means extracts the object image from the image region that is further restricted based on the horizontal position of the object detected by the radar.

6. The object-detecting device as in claim 3, wherein:
the object image-extracting means sets an image region to be searched for extracting the object image on the front image taken by the taking means by enlarging or reducing a size of the image region on the memorized front image; and
the calculating means calculates a present distance to the object when the image region corresponding to the memorized front image is found on the present front image.

7. The object-detecting device as in claim 6, wherein
the radar further detects a speed of the object relative to the automobile;
the taking means repeatedly takes the front image at a predetermined interval;
the calculating means calculates an estimated distance to the object which is expected when the front image is taken next time, based on the distance to the object and the relative speed; and
the extracting means sets at least one of an estimated object size and an estimated object position on the present image based on the estimated distance, and sets an image region to be searched for extracting the object image based on the at least one of the estimated object size the estimated object position.

8. The object-detecting means as in claim 7, wherein:
the extracting means further calculates a center position of the object on the front image and sets an image region to be searched for extracting the object image so that the image region is defined at both horizontal sides of the center position of the object.

9. The object-detecting means as in claim 7, wherein:
the speed relative to the object is calculated based on the memorized distance to the object and a present distance to the object.

10. The object-detecting means as in claim 1, wherein:
when the distance to the object is not detectable by the radar, the distance memorized in the memorizing means is replaced with the distance calculated by the calculating means; and
the calculated distance and the front image presently taken by the taking means are memorized in the memorizing means as a pair.

* * * * *